United States Patent
Sacco

(10) Patent No.: US 9,449,342 B2
(45) Date of Patent: Sep. 20, 2016

(54) SYSTEM AND METHOD FOR VISUALIZATION OF ITEMS IN AN ENVIRONMENT USING AUGMENTED REALITY

(75) Inventor: Nathan Sacco, San Jose, CA (US)

(73) Assignee: eBay Inc., San Jose, CA (US)

( * ) Notice: Subject to any disclaimer, the term of this patent is extended or adjusted under 35 U.S.C. 154(b) by 709 days.

(21) Appl. No.: 13/283,416

(22) Filed: Oct. 27, 2011

(65) Prior Publication Data

US 2013/0106910 A1    May 2, 2013

(51) Int. Cl.
| | |
|---|---|
| G09G 5/00 | (2006.01) |
| G06Q 30/02 | (2012.01) |
| G06Q 30/06 | (2012.01) |
| G06T 19/00 | (2011.01) |

(52) U.S. Cl.
CPC ...... *G06Q 30/0643* (2013.01); *G06Q 30/0261* (2013.01); *G06T 19/006* (2013.01)

(58) Field of Classification Search
CPC .......................... G06T 19/006; G06Q 30/0643
USPC ........................................................ 345/633
See application file for complete search history.

(56) References Cited

U.S. PATENT DOCUMENTS

| | | | |
|---|---|---|---|
| 4,539,585 A * | 9/1985 | Spackova et al. ............ | 382/100 |
| 6,151,587 A | 11/2000 | Matthias | |
| 6,724,930 B1 | 4/2004 | Kosaka et al. | |
| 7,062,722 B1 | 6/2006 | Carlin et al. | |
| 7,254,779 B1 | 8/2007 | Rezvani et al. | |
| 7,346,543 B1 | 3/2008 | Edmark | |
| 7,848,764 B2 | 12/2010 | Riise et al. | |
| 9,164,577 B2 * | 10/2015 | Tapley ................... | G06F 3/011 |
| 9,240,059 B2 | 1/2016 | Zises et al. | |
| 2001/0034668 A1 | 10/2001 | Whitworth | |
| 2002/0052709 A1 | 5/2002 | Akatsuka et al. | |
| 2002/0094189 A1 * | 7/2002 | Navab et al. .................... | 386/4 |
| 2003/0085894 A1 | 5/2003 | Tatsumi | |

(Continued)

FOREIGN PATENT DOCUMENTS

| | | |
|---|---|---|
| CN | 1802586 A | 7/2006 |
| CN | 101520904 A | 9/2009 |

(Continued)

OTHER PUBLICATIONS

Definition of Polar Coordinate System from Wikipedia on Oct. 11, 2011 via Internet Archive WayBackMachine downloaded on Nov. 17, 2014 from https://web.archive.org/web/20111008005218/http://en.wikipedia.org/wiki/Polar_coordinate_system.*

(Continued)

*Primary Examiner* — Jeffery A Brier
(74) *Attorney, Agent, or Firm* — Schwegman, Lundberg & Woessner, P.A.

(57) ABSTRACT

In various example embodiments, a system and method for visualization of an item in an environment using augmented reality is provided. In example embodiments, environment image data containing an image of an environment is received from a client device. A selection of an item that is under consideration for purchase and placement into an indicated location of the environment is received. An item image of the selected item is scaled to a scale that is based on dimensions determined from the environment image data for the environment. The scaled item image is augmented into the image of the environment at the indicated location to generate an augmented reality image.

20 Claims, 11 Drawing Sheets

(56) References Cited

U.S. PATENT DOCUMENTS

| | | | |
|---|---|---|---|
| 2003/0101105 A1* | 5/2003 | Vock | 705/27 |
| 2003/0112260 A1 | 6/2003 | Gouzu | |
| 2003/0123026 A1 | 7/2003 | Abitbol et al. | |
| 2004/0046779 A1 | 3/2004 | Asano et al. | |
| 2005/0001852 A1* | 1/2005 | Dengler et al. | 345/633 |
| 2005/0081161 A1 | 4/2005 | Macinnes et al. | |
| 2005/0151963 A1 | 7/2005 | Pulla et al. | |
| 2005/0171864 A1* | 8/2005 | Nakade et al. | 705/26 |
| 2006/0012677 A1 | 1/2006 | Neven, Sr. et al. | |
| 2006/0032916 A1 | 2/2006 | Mueller et al. | |
| 2006/0038833 A1 | 2/2006 | Mallinson et al. | |
| 2006/0071945 A1 | 4/2006 | Anabuki | |
| 2006/0071946 A1 | 4/2006 | Anabuki et al. | |
| 2006/0149638 A1 | 7/2006 | Allen | |
| 2006/0184013 A1 | 8/2006 | Emanuel et al. | |
| 2007/0015586 A1 | 1/2007 | Huston | |
| 2007/0143082 A1 | 6/2007 | Degnan | |
| 2008/0071559 A1 | 3/2008 | Arrasvuori | |
| 2008/0074424 A1 | 3/2008 | Carignano | |
| 2008/0142599 A1 | 6/2008 | Benillouche et al. | |
| 2008/0163379 A1 | 7/2008 | Robinson | |
| 2008/0194323 A1* | 8/2008 | Merkli | A63F 13/02 463/30 |
| 2008/0207357 A1 | 8/2008 | Savarese et al. | |
| 2009/0109240 A1 | 4/2009 | Englert et al. | |
| 2009/0232354 A1 | 9/2009 | Camp, Jr. et al. | |
| 2009/0262137 A1 | 10/2009 | Walker et al. | |
| 2009/0287587 A1 | 11/2009 | Bloebaum et al. | |
| 2009/0319887 A1 | 12/2009 | Waltman et al. | |
| 2010/0045701 A1 | 2/2010 | Scott et al. | |
| 2010/0048290 A1 | 2/2010 | Baseley et al. | |
| 2010/0171758 A1 | 7/2010 | Maassel et al. | |
| 2010/0214284 A1 | 8/2010 | Rieffel et al. | |
| 2010/0287511 A1 | 11/2010 | Meier et al. | |
| 2011/0016487 A1 | 1/2011 | Chalozin et al. | |
| 2011/0055054 A1 | 3/2011 | Glasson | |
| 2011/0084983 A1* | 4/2011 | Demaine | A63F 13/10 345/633 |
| 2011/0128300 A1 | 6/2011 | Gay et al. | |
| 2011/0143731 A1 | 6/2011 | Ramer et al. | |
| 2011/0148924 A1 | 6/2011 | Tapley et al. | |
| 2012/0099800 A1 | 4/2012 | Llano et al. | |
| 2012/0105475 A1* | 5/2012 | Tseng | 345/633 |
| 2012/0113141 A1* | 5/2012 | Zimmerman et al. | 345/633 |
| 2012/0327115 A1* | 12/2012 | Chhetri et al. | 345/633 |
| 2013/0050218 A1 | 2/2013 | Beaver, III et al. | |
| 2013/0116922 A1 | 5/2013 | Cai et al. | |
| 2013/0170697 A1 | 7/2013 | Zises | |

FOREIGN PATENT DOCUMENTS

| | | |
|---|---|---|
| CN | 101893935 A | 11/2010 |
| CN | 102156810 A | 8/2011 |
| CN | 102194007 A | 9/2011 |
| CN | 102667913 A | 9/2012 |
| CN | 104081379 A | 10/2014 |
| CN | 104656901 A | 5/2015 |
| EP | 1365358 A2 | 11/2003 |
| JP | 2001283079 A | 10/2001 |
| JP | 2001344479 A | 12/2001 |
| KR | 20090056792 A | 6/2009 |
| WO | WO-9944153 A1 | 9/1999 |
| WO | WO-2011087797 A2 | 7/2011 |
| WO | WO-2011087797 A3 | 7/2011 |
| WO | WO-2013063299 A1 | 5/2013 |
| WO | WO-2013101903 A2 | 7/2013 |

OTHER PUBLICATIONS

Definition of Homogeneous Coordinates from Wikipedia on Mar. 5, 2011 via Internet Archive WayBackMachine downloaded on Nov. 17, 2014 from https://web.archive.org/web/20110305185824/http://en.wikipedia.org/wiki/Homogeneous_coordinates.*

International Application Serial No. PCT/US2012/061966, International Search Report mailed Jan. 18, 2013, 2 pgs.
International Application Serial No. PCT/US2012/061966, Written Opinion mailed Jan. 18, 2013, 4 pgs.
U.S. Appl. No. 13/340,141, Examiner Interview Summary mailed Dec. 11, 2014, 3 pgs.
U.S. Appl. No. 13/340,141, Final Office Action mailed Feb. 6, 2014, 19 pgs.
U.S. Appl. No. 13/340,141, Final Office Action mailed Sep. 26, 2014, 22 pgs.
U.S. Appl. No. 13/340,141, Non Final Office Action mailed Apr. 9, 2015, 13 pgs.
U.S. Appl. No. 13/340,141, Non Final Office Action mailed Jun. 5, 2014, 18 pgs.
U.S. Appl. No. 13/340,141, Non Final Office Action mailed Aug. 29, 2013, 15 pgs.
U.S. Appl. No. 13/340,141, Response filed Feb. 26, 2015 to Final Office Action mailed Sep. 26, 2014, 12 pgs.
U.S. Appl. No. 13/340,141, Response filed May 6, 2014 to Final Office Action mailed Feb. 6, 2014, 12 pgs.
U.S. Appl. No. 13/340,141, Response filed Sep. 5, 2014 to Non Final Office Action mailed Jun. 5, 2014, 14 pgs.
U.S. Appl. No. 13/340,141, Response filed Dec. 30, 2013 to Non Final Office Action mailed Aug. 20, 2013, 13 pgs.
Australian Application Serial No. 2012328754, Office Action mailled Mar. 30, 2015.
European Application Serial No. 12843046.9, Extended European Search Report mailed Mar. 5, 2015, 7 pgs.
European Application Serial No. 12843046.9, Office Action mailed Jun. 4, 2014, 3 pgs.
European Application Serial No. 12843046.9, Response filed Nov. 5, 2014 to Office Action mailed Jun. 4, 2014, 5 pgs.
International Application Serial No. PCT/US2012/061966, International Preliminary Report on Patentability mailed May 8, 2014, 6 pgs.
International Application Serial No. PCT/US2012/071770, International Search Report mailed May 13, 2013, 2 pgs.
International Application Serial No. PCT/US2012/071770, Written Opinion mailed May 13, 2013, 5 pgs.
"MLB at Bat 11", [Online]. Retrieved from the Internet: <URL: http://texas.rangers.mlb.com/mobile/atbat/?c_id=tex>, (Accessed Dec. 22, 2011), 3 pgs.
Kraft, Adam, "Real Time Baseball Aguemented Reality", Washington University in St. Louis, (Dec. 6, 2011), 10 pgs.
Mulloni, Alessandro, et al., "Handheld augmented reality indoor navigation with activity-based instructions", Proceedings of the 13th international conference on human computer interaction with mobile devices and services, (2011), 10 pgs.
Vlahakis, Vassilios, et al., "Archeoguide: first results of an augmented reality, mobile computing system in cultural heritage sites", Virtual Reality, Archeology, and Cultural Heritage, (2001), 9 pgs.
U.S. Appl. No. 13/340,141, Examiner Interview Summary mailed Aug. 4, 2015, 3 pgs.
U.S. Appl. No. 13/340,141, Notice of Allowance mailed Sep. 10, 2015, 9 pgs.
U.S. Appl. No. 13/340,141, Response filed Aug. 6, 2015 to Non Final Office Action mailed Apr. 9, 2015, 11 pgs.
Australian Application Serial No. 2012328754, Response filed Aug. 3, 2015 to Office Action mailed Mar. 30, 2015, 17 pgs.
Canadian Application Serial No. 2,850,074, Office Action mailed Sep. 29, 2015, 6 pgs.
European Application Serial No. 12843046.9, Response filed Sep. 30, 2015, 20 pgs.
Japanese Application Serial No. 2014-539013, Office Action mailed Aug. 11, 2015, with English translation of claims, 7 pgs.
Korean Application Serial No. 2014-7014116, Office Action mailed Jun. 26, 2015, w/English Claims, 13 pgs.
Korean Application Serial No. 2014-7014116, Response filed Aug. 26, 2015, with English translation of claims, 23 pgs.
U.S. Appl. No. 12/644,957, Examiner Interview Summary mailed Apr. 29, 2015, 3 pgs.
U.S. Appl. No. 12/644,957, Examiner Interview Summary mailed Jun. 11, 2014, 3 pgs.

(56) References Cited

OTHER PUBLICATIONS

U.S. Appl. No. 12/644,957, Examiner Interview Summary mailed Sep. 4, 2014, 3 pgs.
U.S. Appl. No. 12/644,957, Final Office Action mailed Jul. 11, 2014, 25 pgs.
U.S. Appl. No. 12/644,957, Final Office Action mailed Aug. 26, 2013, 19 pgs.
U.S. Appl. No. 12/644,957, Non Final Office Action mailed Mar. 7, 2014, 21 pgs.
U.S. Appl. No. 12/644,957, Non Final Office Action mailed Mar. 18, 2013, 17 pgs.
U.S. Appl. No. 12/644,957, Non Final Office Action mailed Dec. 29, 2014, 20 pgs.
U.S. Appl. No. 12/644,957, Notice of Allowance mailed Jun. 17, 2015, 20 pgs.
U.S. Appl. No. 12/644,957, Response filed Apr. 29, 2015 to Non Final Office Action mailed Dec. 29, 2014, 13 pgs.
U.S. Appl. No. 12/644,957, Response filed Jun. 9, 2014 to Non Final Office Action mailed Mar. 7, 2014, 13 pgs.
U.S. Appl. No. 12/644,957, Response filed Jun. 14, 2013 to Non Final Office Action mailed Mar. 18, 2013, 12 pgs.
U.S. Appl. No. 12/644,957, Response filed Sep. 30, 2014 to Final Office Action mailed Jul. 11, 2014, 14 pgs.
U.S. Appl. No. 12/644,957, Response filed Nov. 26, 2013 to Final Office Action mailed Aug. 20, 2013, 11 pgs.
U.S. Appl. No. 14/963,706, Preliminary Amendment filed Mar. 11, 2016, 8 pgs.
Chinese Application Serial No. 201080059424.5, Office Action mailed Apr. 21, 2014, with English translation of claims, 18 pgs.
Chinese Application Serial No. 201080059424.5, Response filed Sep. 4, 2014 to Office Action mailed Apr. 21, 2014, with English translation of claims, 10 pgs.
Chinese Application Serial No. 201280052967.3, Office Action mailed Mar. 2, 2016, with English translation of claims, 18 pgs.
European Application Serial No. 10803429.9, Extended European Search Report mailed Jun. 17, 2015, 7 pgs.
European Application Serial No. 10803429.9, Office Action mailed Aug. 22, 2012, 2 pgs.
European Application Serial No. 10803429.9, Response filed Jan. 29, 2013 to Office Action mailed Aug. 22, 2012, 10 pgs.
International Application Serial No. PCT/US2010/061628, International Preliminary Report on Patentability mailed Jul. 5, 2012, 6 pgs.
International Application Serial No. PCT/US2010/061628, International Search Report mailed Aug. 12, 2011, 4 pgs.
International Application Serial No. PCT/US2010/061628, Written Opinion mailed Aug. 12, 2011, 4 pgs.
Japanese Application Serial No. 2014-539013, Response filed Dec. 9, 2015 to Office Action mailed Aug. 11, 2015, 16 pgs.
Korean Application Serial No. 2012-7019181, Notice of Appeal filed Feb. 4, 2015, with English translation of claims, 24 pgs.
Korean Application Serial No. 2012-7019181, Notice of Final Rejection mailed Nov. 3, 2014, with English translation of claims, 7 pgs.
Korean Application Serial No. 2012-7019181, Notice of Preliminary Rejection mailed Nov. 18, 2013, with English translation of claims, 11 pgs.
Korean Application Serial No. 2012-7019181, Office Action mailed Jun. 26, 2014, with English translation of claims, 5 pgs.
Korean Application Serial No. 2012-7019181, Response filed Feb. 18, 2014 to Notice of Preliminary Rejection mailed Nov. 18, 2013, with English translation of claims, 26 pgs.
Korean Application Serial No. 2014-7014116, Final Office Action mailed Jan. 29, 2016, 8 pgs.
Korean Application Serial No. 2014-7014116, Request for Re-Examination filed May 2, 2016, with English translation of claims, 22 pgs.
Kan, et al., "Applying QR Code in Augmented Reality Applications", VRCAI, (Dec. 15, 2009), 253-258.

* cited by examiner

SYSTEM AND METHOD FOR VISUALIZATION OF ITEMS IN AN ENVIRONMENT USING AUGMENTED REALITY

FIELD

The present disclosure relates generally to image processing, and in a specific example embodiment, to visualization of items in an environment using augmented reality.

BACKGROUND

Conventionally, when an individual shops for an item, the individual must mentally visualize what the item will look like in the environment that the individual intends to place the item. Often, the individual has difficulty imagining the item with proper dimensions and orientation. In some cases, the individual may purchase the item only to realize that the item does not ideally fit in the environment. As a result, the individual may end up returning the item or otherwise disposing of the item (e.g., sell, trade, give away).

BRIEF DESCRIPTION OF DRAWINGS

Various ones of the appended drawings merely illustrate example embodiments of the present invention and cannot be considered as limiting its scope.

DETAILED DESCRIPTION

Figure 1:
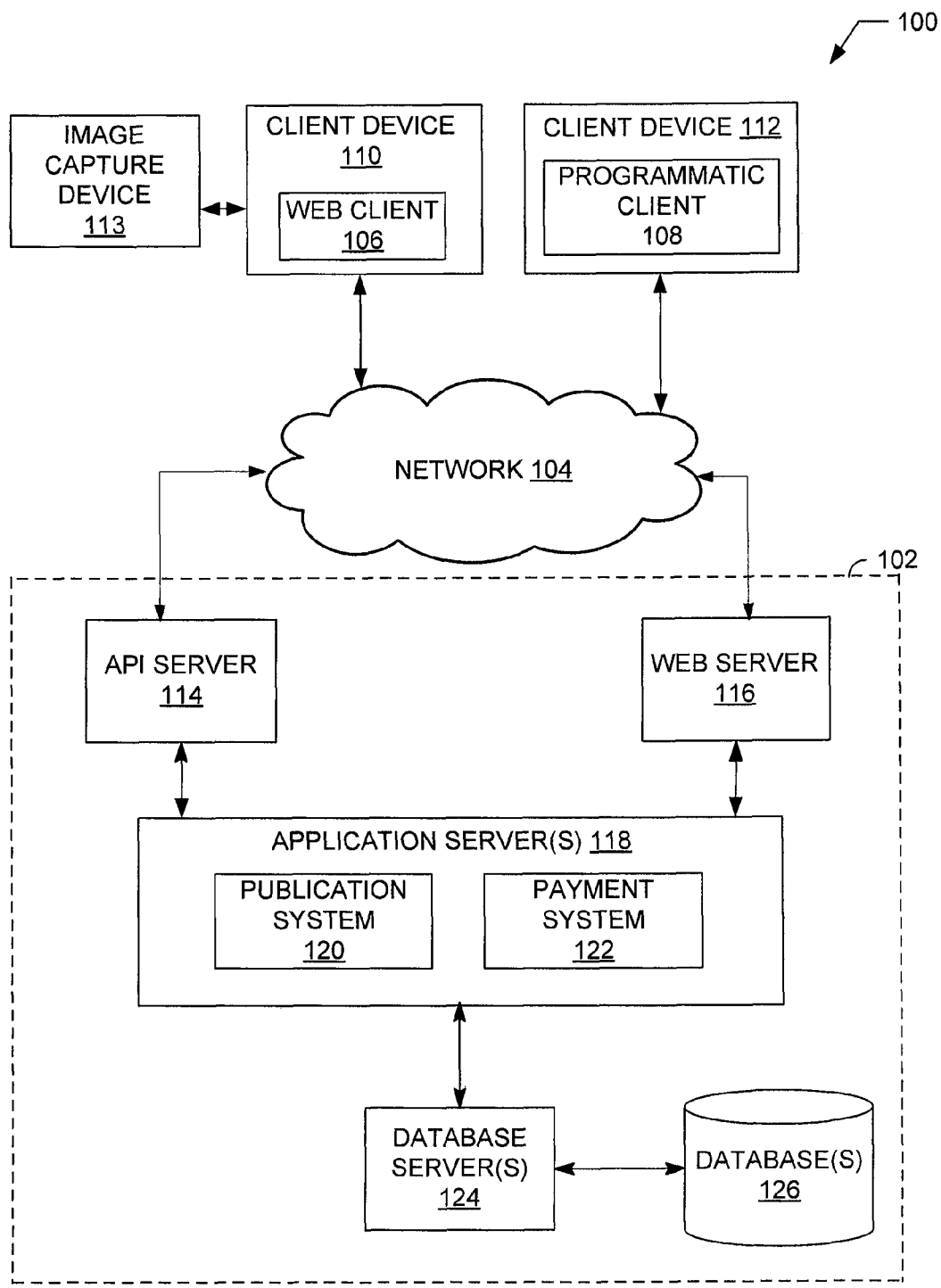
FIG. 1 is a block diagram illustrating an example embodiment of a network architecture of a system used to determining query aspects.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a marketplace environment, the embodiments are given merely for clarity in disclosure. Thus, any type of electronic publication, electronic commerce, social networking, or electronic business system and method, including various system architectures, may employ various embodiments of the system and method described herein and may be considered as being within a scope of example embodiments. Each of a variety of example embodiments is discussed in detail below.

Example embodiments described herein provide systems and methods for visualizing of an item in an environment using augmented reality. In example embodiments, environment image data containing an image of an environment is received from a client device. A selection of an item that is under consideration for purchase and placement into an indicated location of the environment is received. An item image of the selected item is scaled to a scale that is based on dimensions determined from the environment image data for the environment. The dimensions may be determined based on a calculated distance to a focal point of the indicated location in the environment and on a marker located in the image of the environment. The scaled item image is augmented into the image of the environment at the indicated location to generate an augmented reality image. In some embodiments, the scaled item may be oriented to match an orientation of the indicated location in the environment.

By using embodiments of the present invention, a user may search for an item and augment an image of an environment with an image of the item. Because the user can create and view an augmented reality image of the environment including the selected item, the user can easily visualize the selected item in the environment without having to, for example, manually cut and paste or scale the image of the item into the image of the environment. Therefore, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

With reference to FIG. 1, an example embodiment of a high-level client-server-based network architecture 100 to enable visualization of items in an environment using augmented reality is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash.), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise or be connectable to an image capture device 113 (e.g., camera, camcorder). In further embodiments, the client device 110 may comprise one or more of a touch screen, accelerometer, microphone, and GPS device. The client devices 110 and 112 may be a device of an individual user interested in visualizing an item within an environment.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. The databases 126 may also store user account information of the networked system 102 in accordance with example embodiments.

In example embodiments, the publication system 120 publishes content on a network (e.g., Internet). As such, the publication system 120 provides a number of publication functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment such as an informational or social networking environment.

The payment system 122 provides a number of payment services and functions to users. The payment system 122 allows users to accumulate value (e.g., in a commercial currency, such as the U.S. dollar, or a proprietary currency, such as "points") in their accounts, and then later to redeem the accumulated value for products (e.g., goods or services) that are made available via the publication system 120 or elsewhere on the network 104. The payment system 122 also facilitates payments from a payment mechanism (e.g., a bank account, PayPal™, or credit card) for purchases of items via any type and form of a network-based marketplace.

While the publication system 120 and the payment system 122 are shown in FIG. 1 to both form part of the networked system 102, it will be appreciated that, in alternative embodiments, the payment system 122 may form part of a payment service that is separate and distinct from the networked system 102. Additionally, while the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
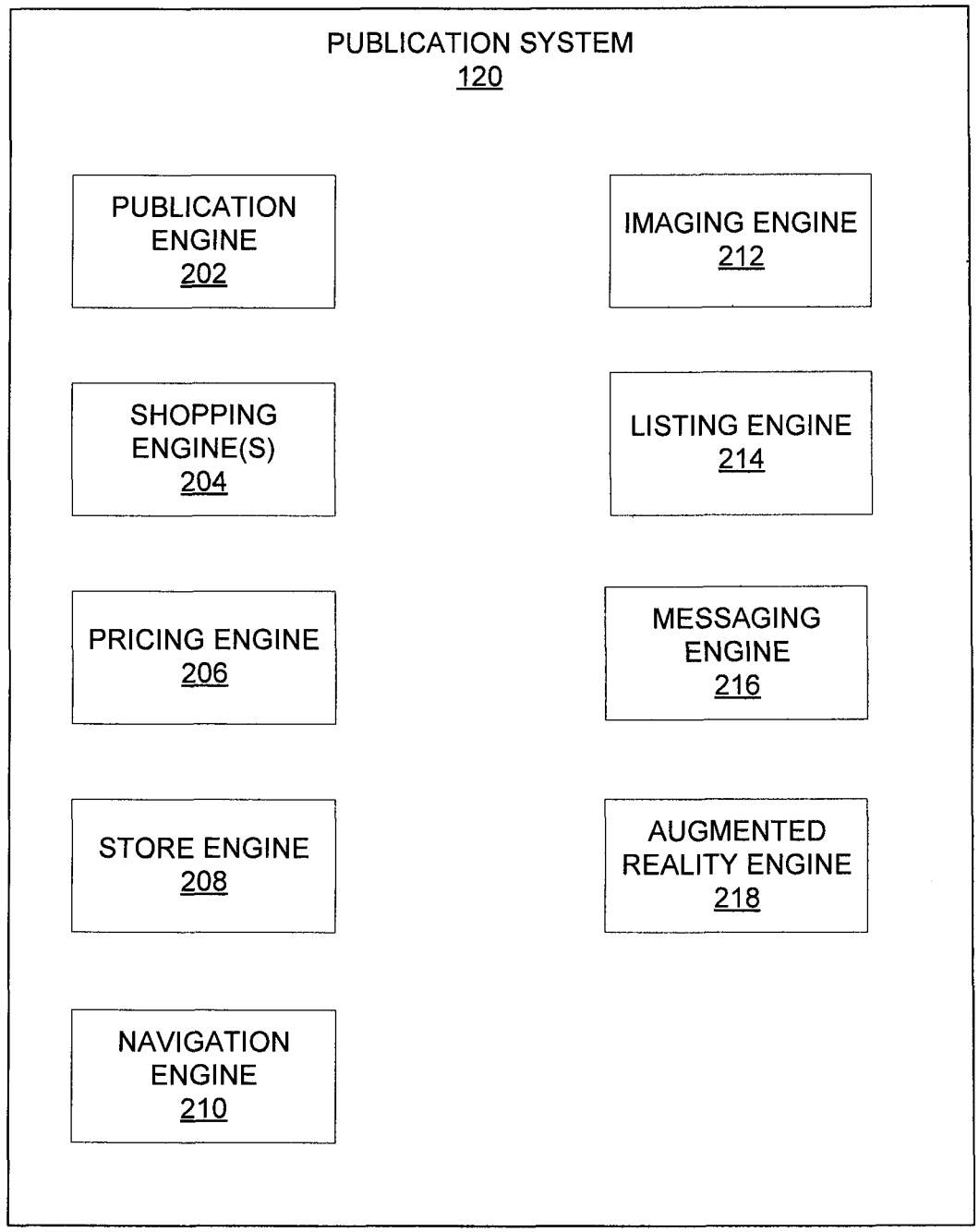
FIG. 2 is a block diagram illustrating an example embodiment of a publication system.

Referring now to FIG. 2, an example block diagram illustrating multiple components that, in one embodiment, are provided within the publication system 120 of the networked system 102 is shown. In one embodiment, the publication system 120 is a marketplace system where items (e.g., goods or services) may be offered for sale. In an alternative embodiment, the publication system 120 is a social networking system or informational system. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 via the one or more database servers 124.

In one embodiment, the publication system 120 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more shopping engines 204. In one embodiment, the shopping engines 204 may support auction-format listing and price setting mechanisms (e.g., English, Dutch, Chinese, Double, Reverse auctions, etc.).

A pricing engine 206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

Navigation of the publication system 120 may be facilitated by a navigation engine 210. For example, a search module (not shown) of the navigation engine 210 enables, for example, keyword searches of listings or other information published via the publication system 120. In a further example, a browse module (not shown) of the navigation engine 210 allows users to browse various category, catalog, or data structures according to which listings or other information may be classified within the publication system 120. Various other navigation applications within the navigation engine 210 may be provided to supplement the searching and browsing applications. In one embodiment, the navigation engine 210 allows the user to search or browse for items in the publication system 120 (e.g., virtual stores, listings in a fixed-price or auction selling environment, listings in a social network or information system). In alternative embodiments, the navigation engine 210 may navigate (e.g., conduct a search on) a network at large (e.g., network 104). Based on a result of the navigation engine 210, the user may select an item that the user is interested in augmenting into an environment.

In order to make listings or posting of information available via the networked system 102 as visually informing and attractive as possible, the publication system 120 may include an imaging engine 212 that enables users to upload images for inclusion within listings and to incorporate images within viewed listings. In some embodiments, the imaging engine 212 also receives image data from a user and utilizes the image data to generate the augmented reality image. For example, the imaging engine 212 may receive an environment image (e.g., still image, video) of an environment within which the user wants to visualize an item. The imaging engine 212 may work in conjunction with the augmented reality engine 218 to generate the augmented reality image as will be discussed in more details below.

A listing engine 214 manages listings on the publication system 120. In example embodiments, the listing engine 214 allows users to author listings of items. The listing may comprise an image of an item along with a description of the item. In one embodiment, the listings pertain to goods or services that a user (e.g., a seller) wishes to transact via the publication system 120. As such, the listing may comprise an image of a good for sale and a description of the item such as, for example, dimensions, color, and, identifier (e.g., UPC code, ISBN code). In some embodiments, a user may create a listing that is an advertisement or other form of publication to the networked system 102. The listing engine 214 also allows the users to manage such listings by providing various management features (e.g., auto-relisting, inventory level monitors, etc.).

A messaging engine 216 is responsible for the generation and delivery of messages to users of the networked system 102. Such messages include, for example, advising users regarding the status of listings and best offers (e.g., providing an acceptance notice to a buyer who made a best offer to a seller) or providing recommendations. The messaging engine 216 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

An augmented reality engine 218 manages the generation of an augmented reality based on an environment image and item specified by a user. The augmented reality engine 218 will be discussed in more detail in connection with FIG. 3 below.

Although the various components of the publication system 120 have been defined in terms of a variety of individual modules and engines, a skilled artisan will recognize that many of the items can be combined or organized in other ways. Alternatively, not all components of the publication system 120 of FIG. 2 may be utilized. Furthermore, not all components of the marketplace system 120 have been included in FIG. 2. In general, components, protocols, structures, and techniques not directly related to functions of exemplary embodiments (e.g., dispute resolution engine, loyalty promotion engine, personalization engines, etc.) have not been shown or discussed in detail. The description given herein simply provides a variety of exemplary embodiments to aid the reader in an understanding of the systems and methods used herein.

Figure 3:
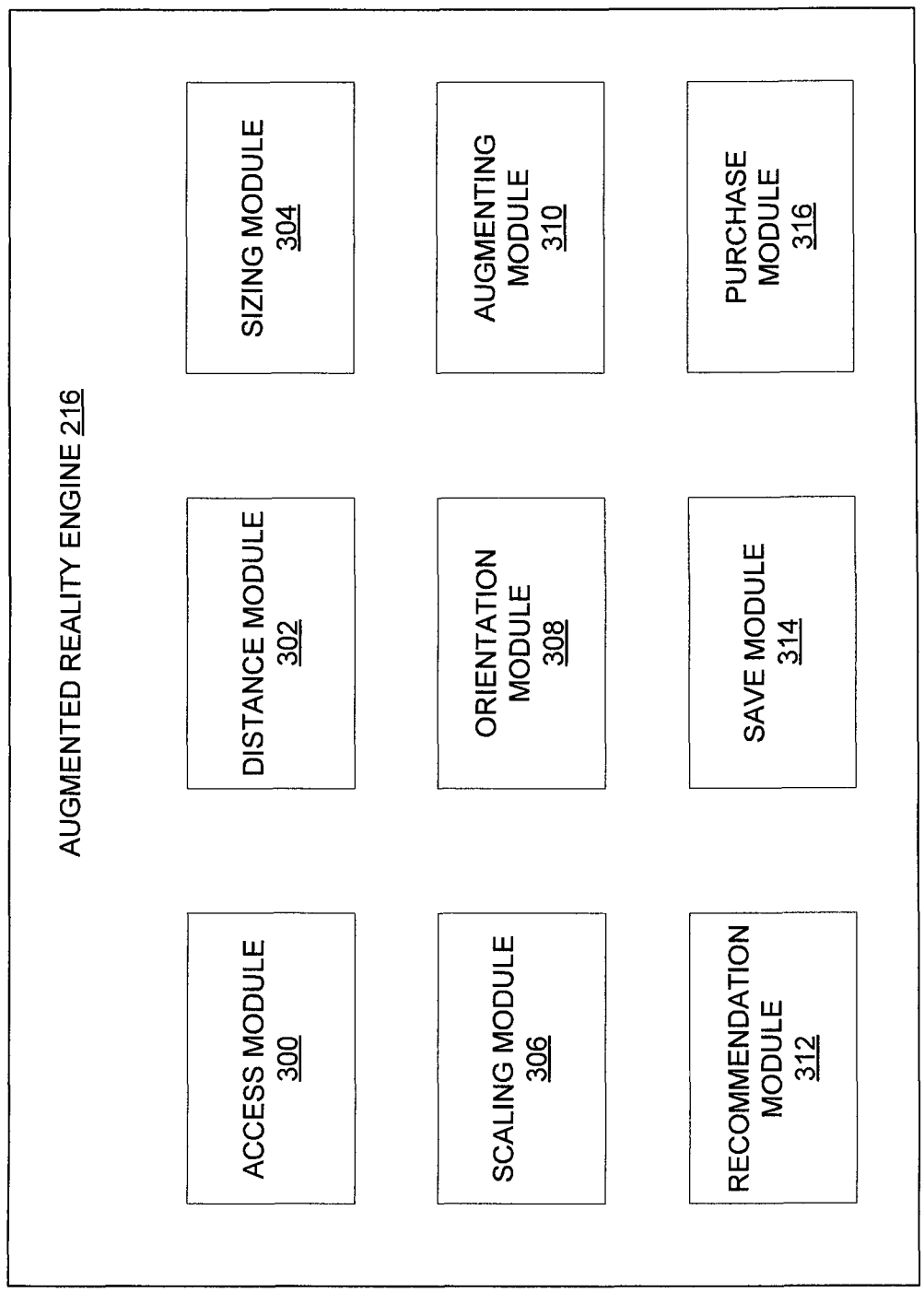
FIG. 3 is a block diagram illustrating an example embodiment of an augmented reality engine.

FIG. 3 is a block diagram illustrating an example embodiment of the augmented reality engine 216. In example embodiments, the augmented reality engine 216 comprises an access module 300, a distance module 302, a sizing module 304, a scaling module 306, an orientation module 308, an augmenting module 310, a recommendation module 312, a save module 314, and a purchase module 316. In alternative embodiments, functions of one or more of the modules of the augmented reality engine 216 may be combined together, one or more of the modules may be removed from the augmented reality engine 216, or one or more of the modules may be located elsewhere in the networked system 102 (e.g., the imaging engine 214, shopping engines 204) or at the client device 110.

In example embodiments, the imaging engine 212 may receive environment image data of an environment (e.g., still image, video) from the client device 110. The environment image data is then provided to the augmented reality engine 216 for processing. In some embodiments, the augmented reality engine 216 also receives item data for an item that the user is interested in visualizing in the environment and an indication of a location where the item is to be augmented in the environment. The item data may be provided by the navigation engine 210 based on a user selection of an item found using a search or browsing function of the navigation engine 210.

Alternatively, the item data may be received from the client device 110. For example, the user may capture an image of an item that the user is interested in augmenting into the environment (e.g., take a photo of an item at a store). The user may, in some cases, enter information regarding the item such as dimensions or an identifier (e.g., UPC code). The augmented reality engine 216 receives the item data from the client device 110.

The access module 300 accesses item data for a selected item. In some embodiments, an item to be augmented into the environment may be selected by a user at the client device and the selection is received, for example, by the navigation engine 210. In other embodiments, the selection is received by the access module 300. Based on the selection, the access module 300 may access information corresponding to the selection. If the selection is an item listing for the item, the access module 300 may access the item listing and extract item data (e.g., dimensions, images) from the listing. In other examples, if the selection is a user inputted name or other item identifier of an item (e.g., UPC code), the access module 300 may access a catalog (e.g., stored in the database 126) that stores item data using the item identifier.

The distance module 302 determines a distance to a focal point in an image of the environment. The focal point may be a user selected area (also referred to as an "indicated location") where an item image is to be augmented. For example, if the environment is a room, the distance to a wall where the item image is to be augmented may be determined. In one embodiment, the distance module 302 may use a focus capability of the image capture device 113 of, or coupled to, the client device 110 to determine the distance. Alternatively, the distance module 302 may use an echo technique using the client device 110 as a sound generator to determine the distance. For example, the client device 110 may generate a sound in the direction of the wall and an amount of time is registered for an echo to be returned. The distance module 302 may use this amount of time to determine the distance. As such, the distance is from a point of view of the viewer or image capture device (e.g., camera) to the focal point.

The sizing module 304 determines sizing for the environment. In example embodiments, the sizing module 304 uses a marker (an object with known standard dimensions) in the environment image data to calculate the sizing. For example, if a door is shown in the environment image data, the sizing module 304 may assume that the door is a standard sized door (e.g., 36"×80") or that a door knob is located at 36" from the floor. Using these known standard dimensions, sizing for the environment may be determined. In another example, if the environment is an automobile, the marker may be a wheel well of the automobile. In this example, the user may specify a type of automobile when providing the environment image data.

The scaling module 306 scales an image of the item based on the distance and sizing determined by the distance module 302 and the sizing module 304, respectively. Accordingly, the scaling module 306 may receive (e.g., from the navigation engine 210) or retrieve the item data (e.g., from the database 126) for a selected item. The item data may include an item image, dimensions, or an item identifier. If the item image and dimensions are provided, then the scaling module 306 may use the item image and the dimensions to scale the item image to the environment based on the sizing determined by the sizing module 304. Alternatively, if one of the image or dimension is not provided, the item identifier may be used to look up the item in an item catalog which may contain an image and item information for the item (e.g., dimensions and description). In one embodiment, the scaling module 306 may look up and retrieve the item information from the item catalog.

Once the item image is scaled, the scaled item image may be oriented to the environment by the orientation module 308. For example, if the environment image has a wall at a slight angle and the scaled item image is to be placed on the wall, the orientation module 308 orients the scaled item image to the angle of the wall. It is noted that functionality of any of the distance module 302, sizing module 304, scale module 306, and orientation module 308 may be combined into one or more modules that can determine proper sizing and orientation for the item image. In some embodiments, these combined modules may comprise or make use of one or more gyroscopes or accelerometers.

The augmenting module 310 augments the scaled and oriented item image with the environment image to create an augmented reality image. The augmenting module 310 then provides the augmented reality image to the client device 110.

The recommendation module 312 optionally provides recommendations for alternative items for the environment. For example, if the scaled and oriented item image appears too large for an indicated area on the environment image (e.g., as determined by the augmenting module 310), the recommendation module 312 may suggest one or more alternative items that are smaller and will fit better in the indicated area. Accordingly, the recommendation module 312 may determine a dimension that is more appropriate for the indicated area and perform a search (e.g., provide instructions to the navigation engine 210 to perform a search) to find one or more alternative items. The recommendation module 312 may then retrieve the item information and provide the alternative items as a suggestion to the user. In one embodiment, the alternative items may be listed on a side of a display that is displaying the augmented reality image or on a pop-up window.

The save module 314 saves the environment image for later use. In one embodiment, the environmental image may be stored to the database 126 of the networked environment 102. Alternatively, the environmental image may be stored to the client device 110. For example, the user may record the environmental image for a room and save the environmental image. At a later time, the user may obtain an item image for an item that the user is interested in augmenting into the saved environmental image. The save module 314 may access and retrieve the saved environmental image.

The purchase module 316 allows the user to purchase the item that is augmented into the environment or an alternative item recommended by the recommendation module 312. In one embodiment, the purchase module 316 provides a selection on or near the augmented reality image that when selected takes the user to, for example, a purchase page for the item, a store front for a store that sells the item, or search page with search results for availability of the item for purchase. In another embodiment, an activation of the selection may initiate an automatic purchase of the item. Once selected, the purchase module 316 performs the corresponding actions to facilitate the purchase (e.g., send a search for the item to the navigation engine 210, provide one or more listings using the shopping engine 204, provide a webpage associated with the store engine 208).

Figure 4:
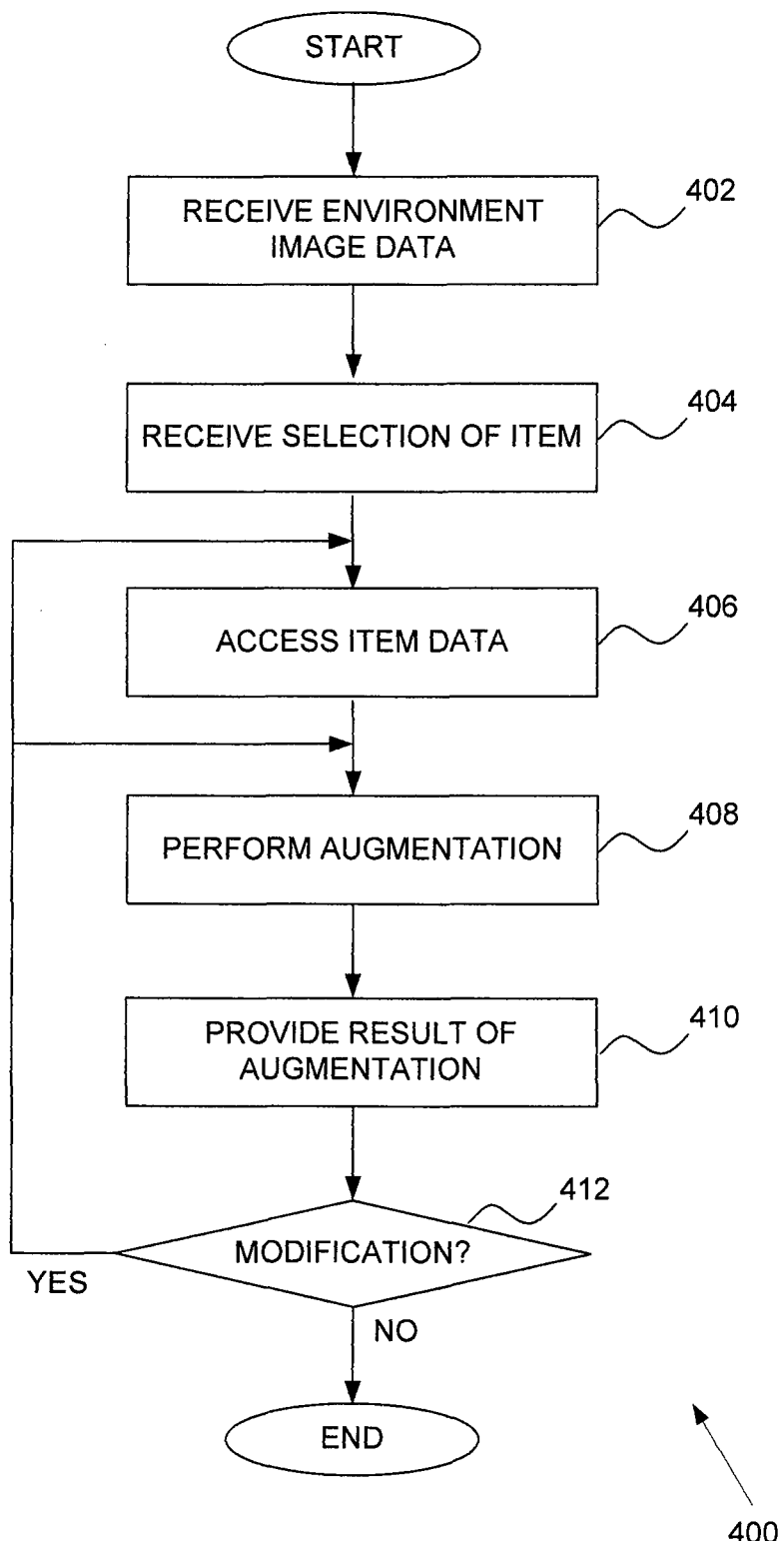
FIG. 4 is a flow diagram of an example high-level method for visualization of an item in an environment using augmented reality.

FIG. 4 is a flow diagram of an example high-level method 400 for visualization of an item in an environment using augmented reality. In operation 402, environment image data is received. In example embodiments, the imaging engine 212 may receive the environment image data from a client device 110. The environment image data may comprise an image of an environment into which the user wants to augment an item image.

In operation 404, a selection of an item to be augmented into the environment is received. In some embodiments, the navigation engine 210 receives a selection of the item from the client device. In other embodiments, the imaging engine 212 receives an image of an item that the user is interested in augmenting into the environment.

Based on the received selection of the item, item data is accessed in operation 406. The access module 300 accesses item data for the selected item. The item data may be extracted from an item listing for the item, retrieved from an item catalog, or retrieved from a website of a manufacturer or reseller (e.g., using an item identifier of the item).

In operation 408, augmentation processing is performed. Augmentation processing takes the environment image data and the selected item and augments or merges an item image for the item into an environment image. The operations of the augmentation processing will be discussed in detail with respect to FIG. 5.

The result of the augmentation is provided in operation 410. The result may comprise a video of the environment with the selected item augmented into the environment (referred to as "the augmented reality image"). In example embodiments, the augmenting module 310 provides the augmented reality image to the client device 110 of the user that provided the environment image, the item selection, or both.

In operation 412, a determination is made as to whether a modification is received. In some embodiments, the modification may be caused by the movement of the image capture device 113. For example, if the image capture device 113 is a video camera, then the modification is the movement within the environment as captured by the video camera. In another embodiment, the user may select an alternative item based on a recommendation provided by the recommendation module 312. Based on the modification, the method 400 may return to either operation 406 to access item data for the new item or to operation 408 to perform augmentation processing based on, for example, the movement within the environment.

Figure 5:
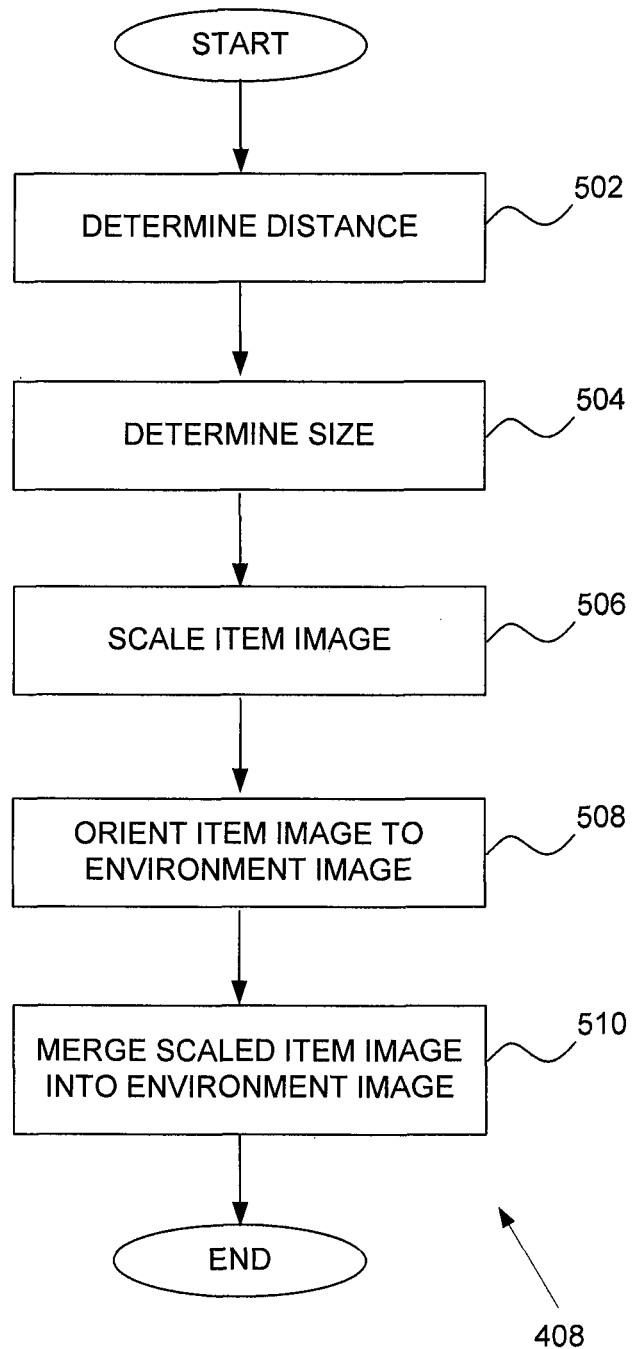
FIG. 5 is a flow diagram of an example high-level method for generating an augmented reality image.

FIG. 5 is a flow diagram of an example high-level method (operation 408) for generating the augmented reality image. In operation 502, a distance is determined by the distance module 302. The distance module 302 determines a distance to a focal point in the environment. The focal point may be a user selected area where an item image is to be augmented. In one embodiment, the distance module 302 may use capabilities (e.g., focus, echo based on sound) of the image capture device 113 of, or coupled to, the client device 110 to determine the distance.

In operation 504, sizing for the environment is determined by the sizing module 304. In example embodiments, the sizing module 304 uses a marker in the environment image data to calculate the sizing. Using known standard dimensions of the marker, sizing for the environment may be determined by the sizing module 304.

The item image is scaled in operation 506. The scaling module 306 scales an image of the item based on the distance and sizing determined by the distance module 302 and the sizing module 304, respectively. Accordingly, the scaling module 306 may receive or retrieve the item data including an item image, dimensions, or an item identifier. The retrieved item data is then used in association with the determined distance and sizing data to scale the item image.

Once the item image is scaled, the scaled item image may be oriented to the environment, in operation 508, by the orientation module 308. For example, if the environment image has a wall at a slight angle and the scaled item image is to be placed on the wall, the orientation module 308 orients the scaled item image to the angle of the wall.

In operation 510, the scaled and oriented item image is merged into the environment image. The augmenting module 310 augments the scaled and oriented item image with the environment image to create an augmented reality image. It is noted that operations of FIG. 5 may be combined into fewer operations. Alternatively, some of the operations of FIG. 5 may be optional.

Figure 6A:
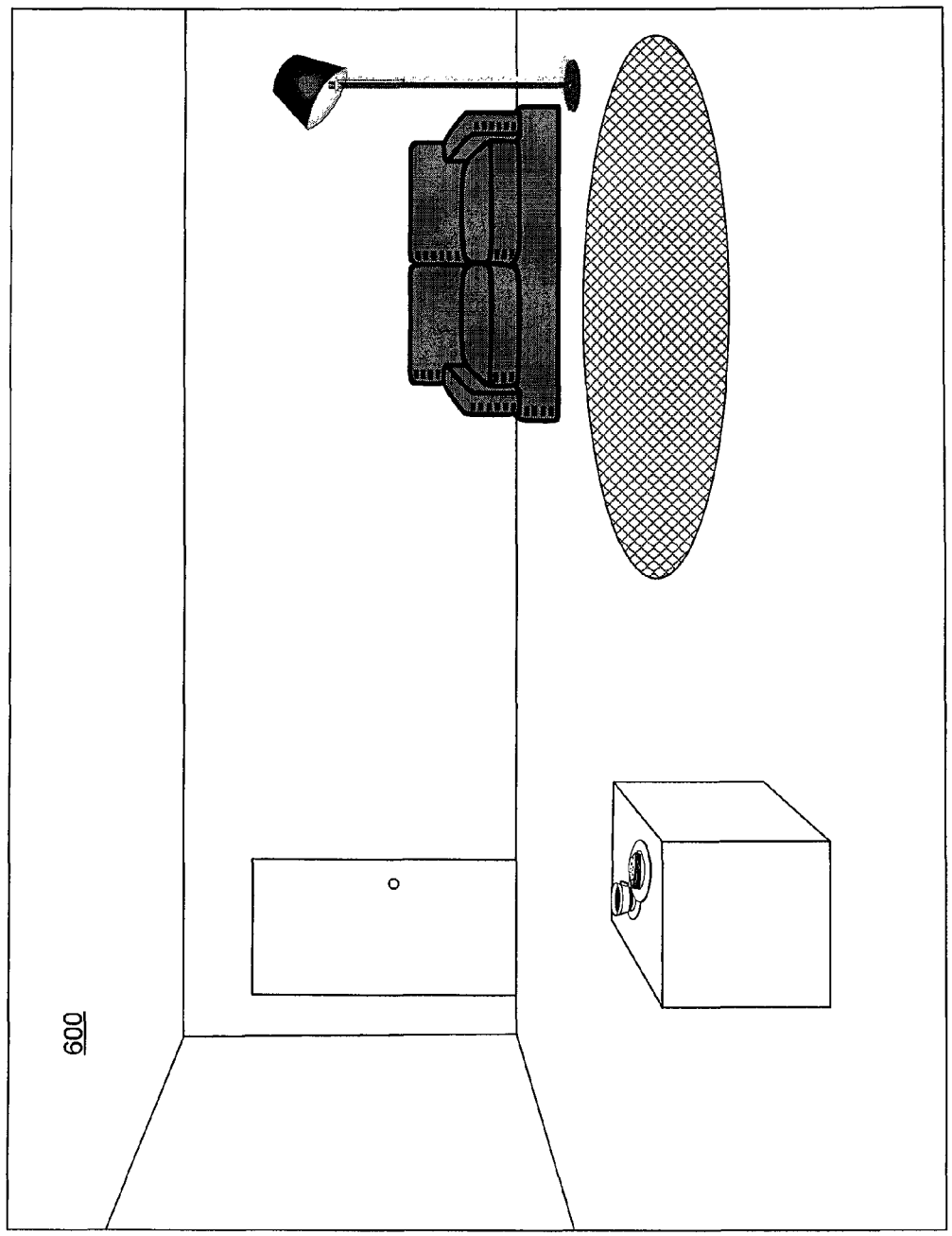
FIG. 6A is a screenshot of an example of an environment image.

FIG. 6A is a screenshot of an example of an environment image 600. The environment image 600 may be captured by the image capture device 113 or retrieved from a storage location (e.g., database 126). In the present example, the environment image 600 is an image of a room in which a user wants to augment an item. In the present case, the environment image 600 is taken from a location where the user may want to view the item. For example, if the item is a flat panel television, the environment image 600 may be taken from a location where the user will position a sofa to view the flat panel television.

Figure 6B:
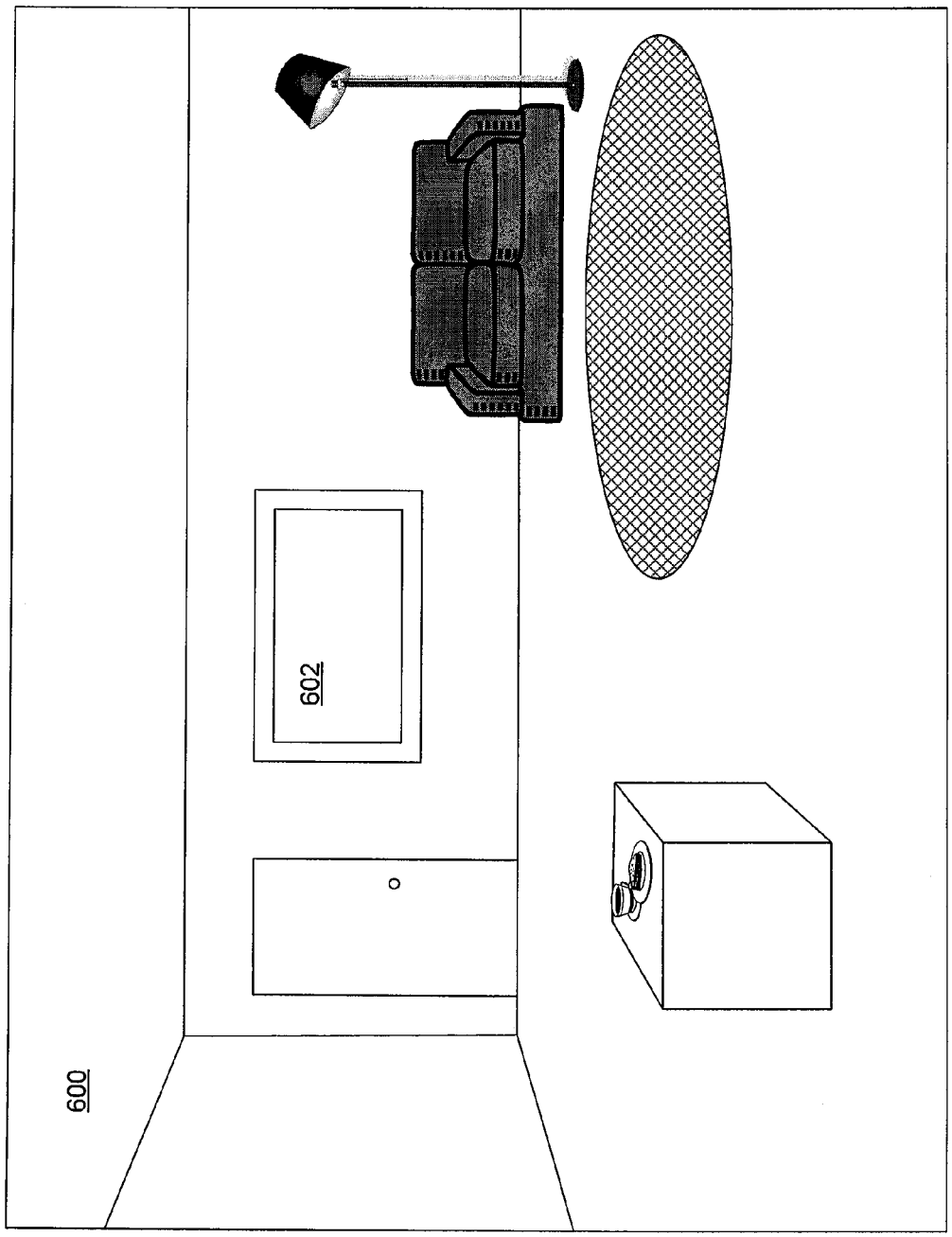
FIG. 6B is a screenshot of the environment image with an augmented item image.

FIG. 6B is a screenshot of the environment image 600 with an augmented item image. In the present example, an image of a flat panel television 602 selected by the user is positioned in a location indicated by the user in the environment image 600. In one embodiment, additional information may be obtained by activating a selection on a display displaying the screenshot. For example, the user may select the image of the flat panel television 602 on the screenshot to open up a new window (e.g., a new window over a portion of the screenshot) that provides purchase information (e.g., where to buy, links to online stores, a listing for the item, prices), item information (e.g., dimensions, description), alternative recommendations (e.g., smaller or larger items, comparable items, less expensive items, newer version of the item), or any combination of these.

Figure 6C:
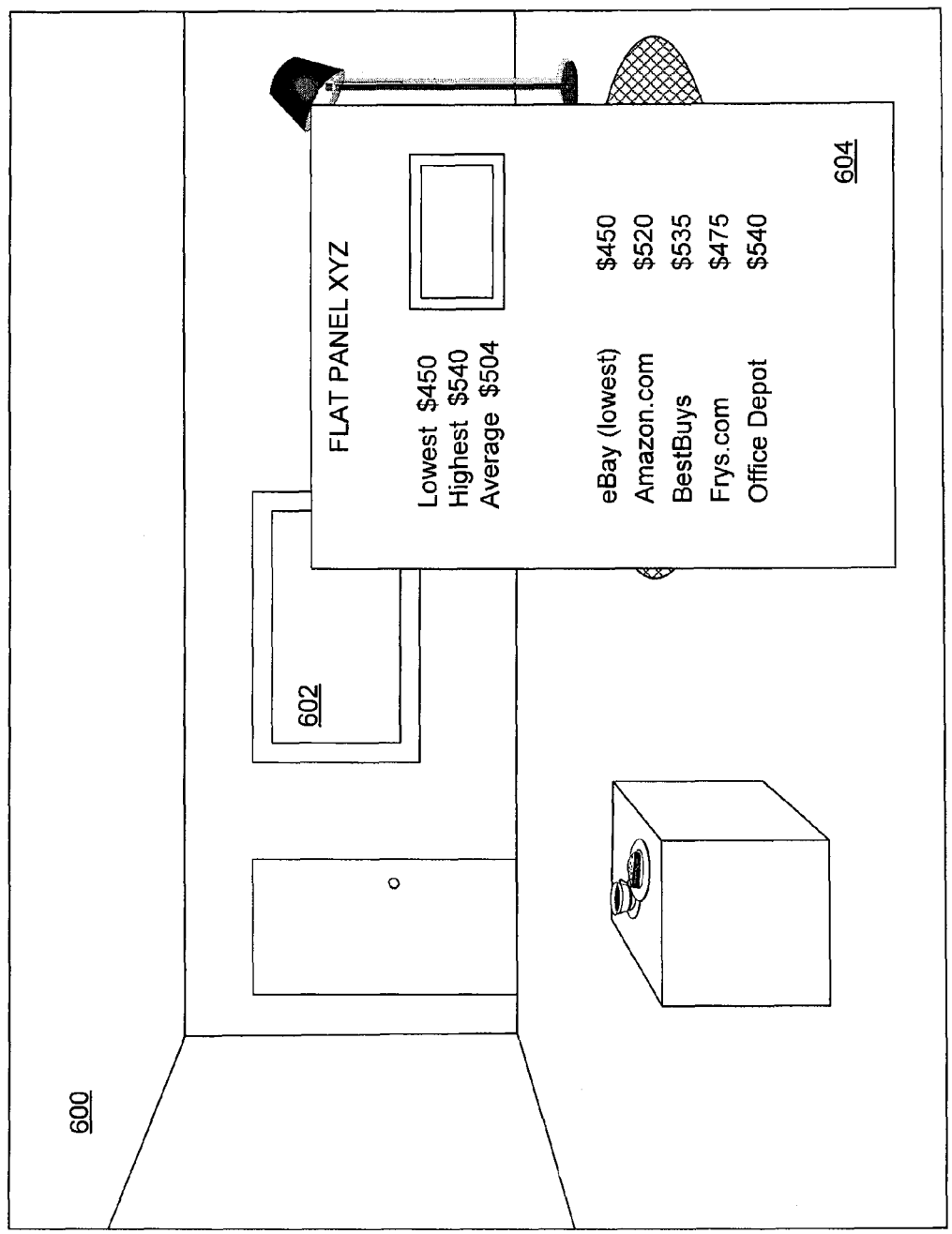
FIG. 6C illustrates an example screenshot displaying shopping information pertaining to the selected item.

FIG. 6C illustrates an example screenshot displaying shopping information in a new window pertaining to the selected item. In the present example, a window 604 provides shopping information including a lowest, highest, and average price along with links to various marketplaces where the item may be purchased. The window 604 is provided when the user makes a selection of the image of the flat panel or performs some other action to indicate a desire to receive additional information.

Figure 6D:
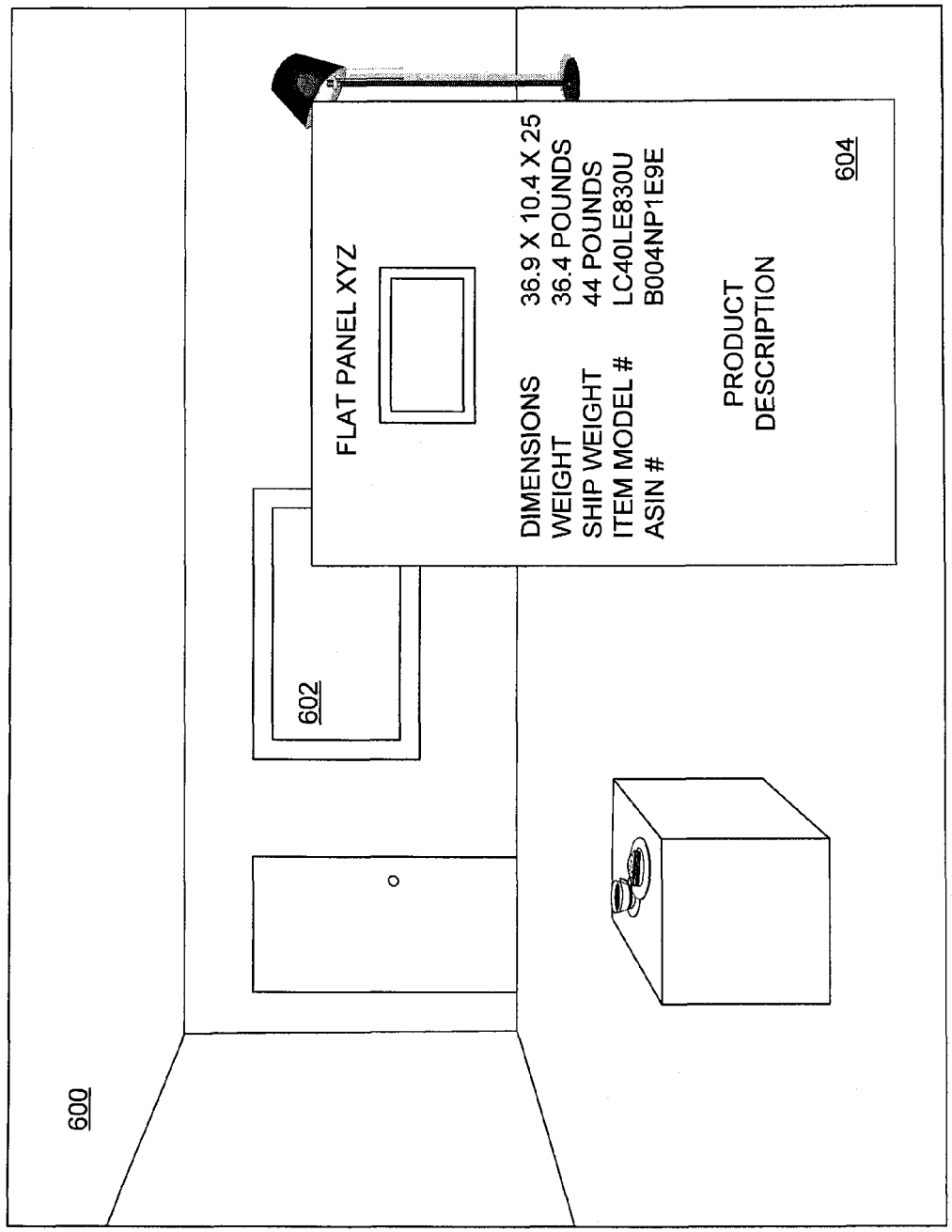
FIG. 6D illustrates an example screenshot displaying a window providing additional information for the selected item.

FIG. 6D illustrates an example screenshot displaying the window 604 providing additional information for the selected item. In the present example, the window 604 provides dimensions, weight, item identifiers, and product description of the selected item. Any information pertaining to the selected item may be provided in the window 604.

Figure 6E:
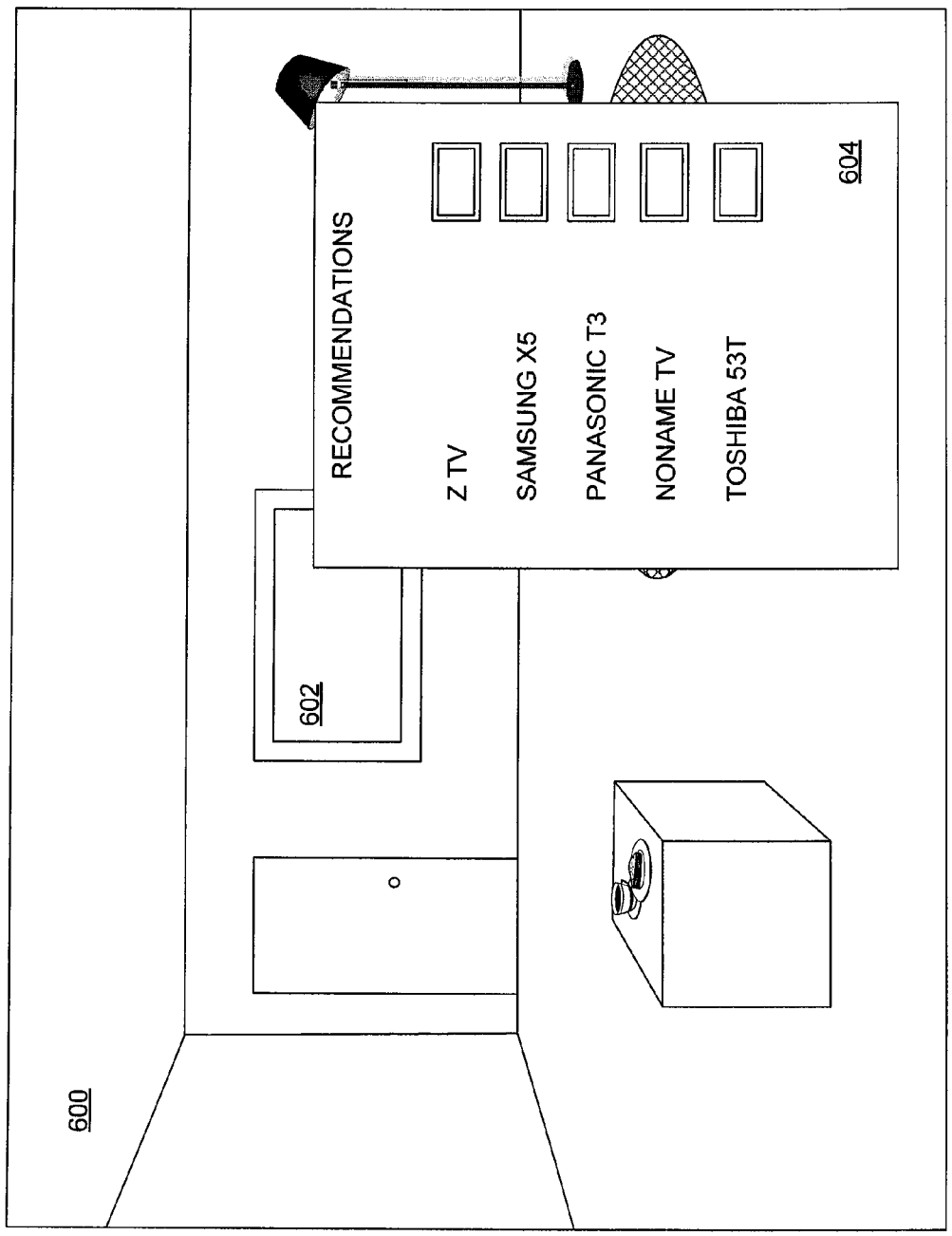
FIG. 6E illustrates an example screenshot displaying a window having recommendations.

FIG. 6E illustrates an example screenshot displaying the window 604 having recommendations. The recommendations may be provided by the recommendation module 312 and include a name of each recommended item and an image of the recommended item. Other information, such as price, ratings, or dimensions, may also be provided in the window 604. The recommendations may be, for example, items that may fit in the user designated location better, items less expensive than the selected item, items that are a new model of the selected item, or items that rank higher based on other users of the system.

While the various examples of FIGS. 6C-6E show provide the window 604 for displaying additional information, alternative embodiments may use other display mechanisms to provide the additional information. For example, the additional information may be displayed on a side of a display showing the environment image 600.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 7:
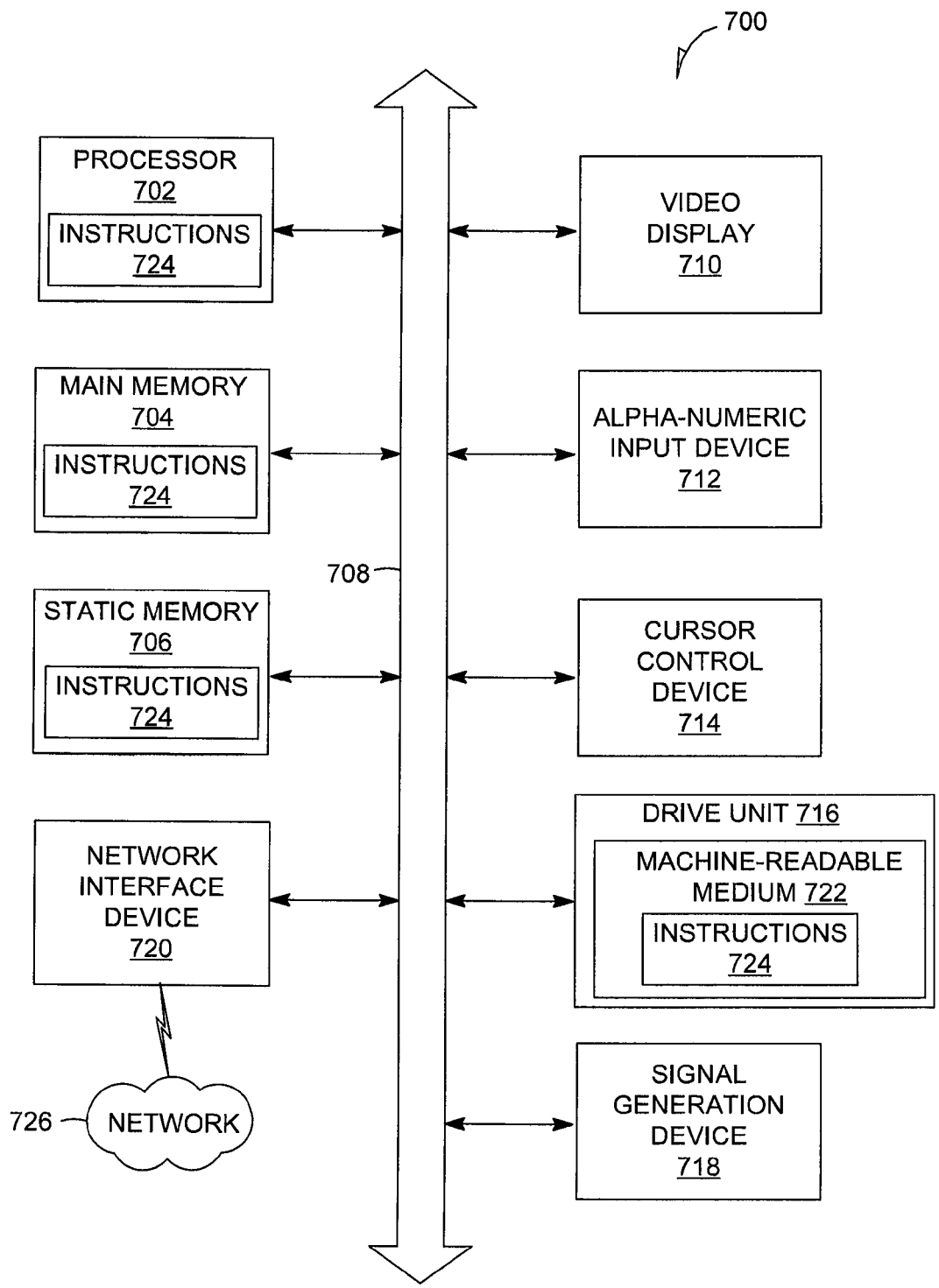
FIG. 7 is a simplified block diagram of a machine in an example form of a computing system within which a set of instructions for causing the machine to perform any one or more of the methodologies discussed herein may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

Machine-Readable Storage Medium

The disk drive unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable media. The instructions 724 may also reside in the static memory 706.

While the machine-readable storage medium 722 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually. or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, from a client device, environment image data containing an image of an environment captured by the client device;
receiving a selection of an item that is under consideration for purchase and placement into an indicated location of the image of the environment;
determining a distance to the indicated location in the image of the environment, the distance being from a point of view of the client device that captured the image of the environment;
in response to receiving the selection of the item, scaling an item image of the selected item based on dimensions and the distance determined from the environment image data for the environment;
augmenting, using at least one processor of an application server, the scaled item image into the image of the environment at the indicated location to generate an augmented reality image;
providing the augmented reality image to a display device of a user, the scaled item image in the augmented reality image being selectable to cause display of additional information;
receiving a selection of the scaled item image in the augmented reality image; and
in response to the receiving the selection of the scaled item image, causing, by the application server, presentation of the additional information.

2. The method of claim 1, wherein the causing presentation of the additional information in response to the receiving the selection of the scaled item image comprises causing presentation of
at least one alternative recommendation, the least one alternative recommendation being a smaller or larger item.

3. The method of claim 1, wherein the determining the distance to the indicated location comprises using environment image data derived from a focus capability of an image capture device associated with the client device to determine the distance.

4. The method of claim 1, further comprising determining the dimensions for the environment using a marker located in the environment.

5. The method of claim 1, further comprising:
determining an orientation of the indicated location; and
orienting the item image to the determined orientation of the indicated location.

6. The method of claim 1, wherein the image of the environment comprises a video of the environment, the scaling of the item image and the augmenting of the scaled item image being repeatedly performed for the video.

7. The method of claim 1, wherein the receiving of the selection of the item comprises receiving the item image for the item.

8. The method of claim 1, further comprising obtaining item data for the item from an item catalog, the item data including dimension data for the item.

9. The method of claim 1, further comprising extracting item data from a publication associated with the selection.

10. The method of claim 1, wherein the causing the presentation of the additional information in response to the receiving the selection of the scaled item image comprises causing presentation of at least one alternative recommendation, the least one alternative recommendation being an item that is less expensive than the item.

11. The method of claim 1, wherein the causing presentation of the additional information in response to the receiving the selection of the scaled item image comprises causing presentation of shopping information including a lowest, highest, and average price along with links to various marketplaces where the item may be purchased.

12. The method of claim 1, wherein the causing presentation of the additional information in response to the receiving the selection of the scaled item image comprises causing presentation of a window presented over the augmented reality image that displays a dimension, weight, item identifier, and product description of the item.

13. The method of claim 1, wherein the causing the presentation of the additional information in response to the receiving the selection of the scaled item image comprises causing presentation of at least one alternative recommendation, the least one alternative recommendation being a newer version of the item.

14. The method of claim 1, wherein the determining the distance to the indicated location comprises using environment image data based on an echo technique performed by a sound generator of the client device to determine the distance.

15. The method of claim 1, wherein the causing the presentation of the additional information in response to the receiving the selection of the scaled item image comprises causing presentation of at least one alternative recommendation, the least one alternative recommendation being an item that ranks higher than the item.

16. A system comprising:
at least one processor of a machine and executable instructions that, when executed by the at least one processor, cause the at least one processor to perform operations comprising:
receiving, from a client device, environment image data containing an image of an environment captured by the client device;
receiving a selection of an item that is under consideration for purchase and placement into an indicated location of the image of the environment;
determining a distance to the indicated location in the image of the environment, the distance being from a point of view of the client device that captured the image of the environment;
scaling an item image of the selected item based on dimensions and the distance determined from the environment image data for the environmental image data in response to receiving the selection of the item;
augmenting the scaled item image into the image of the environment at the indicated location to generate an augmented reality image;
providing the augmented reality image to a display device of a user, the scaled item image in the augmented reality image being selectable to cause display of additional information;

receiving a selection of the scaled item image in the augmented reality image; and in response to the receiving the selection of the scaled item image causing presentation of the additional information.

17. The system of claim 16, wherein the operations further comprise determining the dimensions for the environment using a marker located in the environment.

18. The system of claim 16, wherein the operations further comprise determining an orientation of the indicated location, and orienting the item image to the determined orientation of the indicated location.

19. The system of claim 16, wherein the operations further comprise obtaining item data for the item from an item catalog, the item data including dimension data for the item.

20. A non-transitory machine-readable medium storing instructions which, when executed by the at least one processor of a machine, causes the machine to perform operations comprising:

receiving, from a client device, environment image data containing an image of an environment captured by the client device;

receiving a selection of an item that is under consideration for purchase and placement into an indicated location of the image of the environment;

determining a distance to the indicated location in the image of the environment, the distance being from a point of view of the client device that captured the image of the environment;

in response to receiving the selection of the item, scaling an item image of the selected item to a scale based on dimensions and the distance determined from the environment image data for the environment;

augmenting the scaled item image into the image of the environment at the indicated location to generate an augmented reality image;

providing the augmented reality image to a display device of a user, the scaled item image in the augmented reality image being selectable to cause display of additional information;

receiving a selection of the scaled item image in the augmented reality image; and in response to the receiving the selection of the scaled item image causing presentation of the additional information.

* * * * *

UNITED STATES PATENT AND TRADEMARK OFFICE
CERTIFICATE OF CORRECTION

PATENT NO. : 9,449,342 B2
APPLICATION NO. : 13/283416
DATED : September 20, 2016
INVENTOR(S) : Nathan Sacco Page 1 of 1

It is certified that error appears in the above-identified patent and that said Letters Patent is hereby corrected as shown below:

On the Title Page

On page 2, in Column 2, under "Other Publications", Line 25, delete "2012328754,Office" and insert --2012328754, Office--, therefor On page 2, in Column 2, under "Other Publications", Line 26, delete "mailled" and insert --mailed--, therefor On page 2, in Column 2, under "Other Publications", Line 43, delete "Aguemented" and insert --Augmented--, therefor On page 3, in Column 1, under "Other Publications", Line 24, delete "Aug. 20, 2013," and insert --Aug. 26, 2013,--, therefor In the Claims In Column 13, Line 45, in Claim 2, after "of", delete "¶", therefor Signed and Sealed this
Fifth Day of June, 2018

Andrei Iancu
*Director of the United States Patent and Trademark Office*